Aug. 14, 1951     A. L. A. FORTIER     2,564,527
PNEUMATIC SIZE GAUGING DEVICE
Filed Sept. 4, 1947
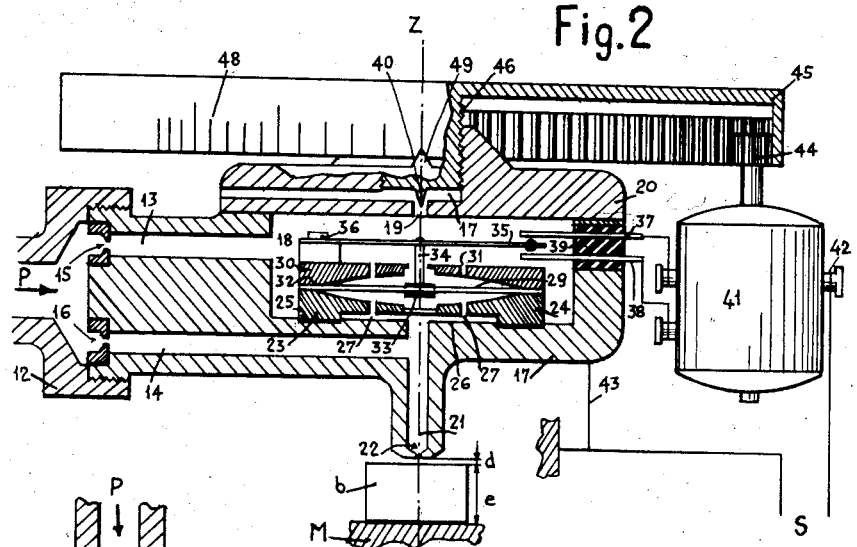
Fig.2
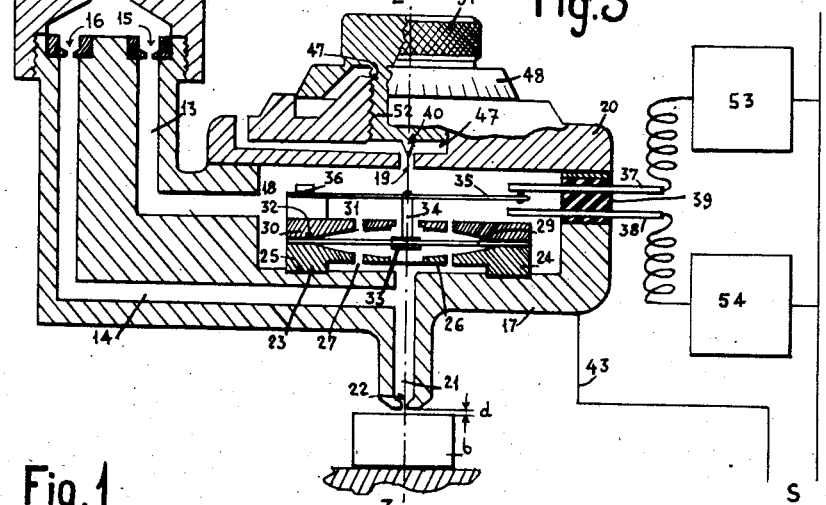
Fig.3
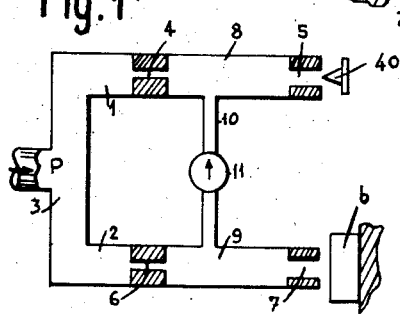
Fig.1
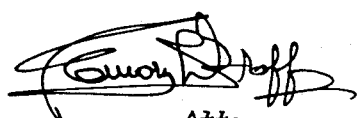
Inventor
Andre L. A. Fortier
BY
Attorney Patented Aug. 14, 1951

2,564,527

UNITED STATES PATENT OFFICE 2,564,527

PNEUMATIC SIZE GAUGING DEVICE

André Louis Aimé Fortier, Grenoble, France, assignor to Etavex S. A., a corporation of Switzerland Application September 4, 1947, Serial No. 772,105
In Switzerland July 18, 1947

1 Claim. (Cl. 73—37.5)

It is known that it is possible to measure the distance between two adjacent surfaces by means of a flow of gas. For this purpose one of the surfaces is pierced with a small orifice through which a gas flows. When the other surface is approached towards the orifice, the free cross section afforded to the passage of the gas depends on the distance between the two surfaces. Under these conditions, the measurement of the outflow of gas or of the pressure at the upflow of the orifice enables the distance between the two surfaces to be determined. In particular when a calibrated orifice of constant cross section is placed in series with the orifice of variable section, according to the position of the two surfaces, the measurement of the resulting pressure $p$ between the two surfaces enables the free cross section of the second orifice to be determined when the pressure is maintained at a given value $P$ at the upflow of the first orifice and when the pressure at the downflow of the second orifice is known, which may be simply atmospheric pressure $p_o$. When the differences in the pressures $P-p$ and $p-p_o$ are small relatively to the pressures $P$, $p$ and $p_o$, the deliveries $Q_1$ through the first orifice and $Q_2$ through the second orifice are proportional to the powers of $P-p$ and $p-p_o$ which vary from 1 to ½ according to the geometrical shape of the cross sections of the two orifices. When equilibrium is established the deliveries $Q_1$ and $Q_2$ are equal. Under these conditions, when the pressure $P$ and $p_o$ are constant, the discharge through the upflow orifice being constant, the pressure $p$ is a function of the magnitude of the section orifice and enables it to be measured after a previous marking by a standard. The second orifice may be located at a distance $d$ from a wall, $p$ is thus the function of $d$ and the measurement of $p$ enables $d$ to be found.

For obtaining correct results, it is necessary to maintain the pressure $P$ constant by means of a pressure regulator or an expanding device located on the upflow of the first orifice.

But the employment of known pressure regulators involves difficulties. The most precise, of the type provided with a container filled with liquid to a constant level into which dips a stationary gas inlet tube, are fragile and of little practical use for commercial measurements. The same applies to liquid gauges. Regulators or ordinary metal gauges lack sensitiveness, accuracy and precision.

It has been proposed, for remedying these disadvantages, to measure the resistance opposed by an orifice to the passage of a gas, not directly by the measurement of a pressure $p$, but by comparison with a known resistance.

One of the best mountings known, for effecting this measurement of comparison, is that shown in Fig. 1 in a diagrammatic manner. It is the equivalent in the field of mechanics of fluids, to the Wheatstone bridge commonly utilised for the measurement of electrical resistances.

The main branches 1 and 2 of this bridge are connected at 3 to a tank of relatively constant pressure P. From the point of connection 3, each branch is provided with two orifices 4, 5 and 6, 7 respectively, resisting the flow of gas and arranged in series, the intermediate sections of the branches forming chambers 8 and 9 between which is located the bridge 10 proper, provided with a differential gauge 11, also serving to indicate equality in pressure. The measuring orifice 7 is located in proximity to a wall $b$, while a movable needle 40 enables the useful cross section to be modified, that is to say the resistance of the comparison orifice 5.

The principal advantage of this assembly of Wheatstone bridge is to render the precision of the measurements liable to be influenced only very slightly by the value of the pressure P at the upflow and by the temperature, so that it is the same in all the parts of the apparatus.

But in order that the measurement be precise and independent of P, it is necessary that the gauge 11, for indicating equality in pressure, be very sensitive. It is necessary, more exactly, for the gauge 11 to be sensitive to the smallest difference which might exist between the pressures in the chambers 8 and 9. It is for this reason that it has been proposed theretofore to use as an indicator of equality in pressure between the chambers a liquid gauge with inclined tubes. Besides its fragility, such a gauge has another serious disadvantage before resistances through the orifices 5 and 7 are equalized under the influence of pressure P. Such inequality of pressure causes the liquid to be emptied from the gauge. It is therefore necessary to provide a tap or bleeder to stop the flow of gas to the sensitive indicator 11 while the resistance 5 is adjusted so as to obtain approximate equality of pressures in the spaces 8 and 9. This tap plays the part of the switch of the electric Wheatstone bridge which only enables current to be passed through the sensitive galvanometer when equilibrium of the bridge is already almost obtained. The operation of this tap, which is indispensible and which, however, has not been provided in the assemblies described so far, renders the apparatus practically useless commercially.

Instead of the liquid gauge with inclined tubes, it is possible to use a metal or mechanical gauge of a known type. In this case, although the gauge may resist a considerable difference in pressure, it is necessarily only slightly sensitive and consequently does not afford the full advantages of the Wheatstone bridge assembly. On the other hand, if the gauge is very sensitive and consequently fragile it is necessary to protect it in such a manner that the large differences in pressure which exist between the chambers 8 and 9 during the adjustments are not liable to damage it.

The present invention has for its object the provision of a differential pressure indicating device with a deformable diaphragm secured at its periphery or rim and separating two gas chambers, applicable to a measuring assembly similar to that shown in Fig. 1. This device is distinguished from other known devices in that it is provided, in combination with a Wheatstone bridge assembly, with at least one bearing surface for limiting the maximum deformation of the diaphragm under the action of a resultant pressure, that is, limiting the movement of the diaphragm so that it will not become damaged and will return to its original neutral position, this bearing surface being so shaped that, practically, the whole of the useful surface of the diaphragm can be applied thereto.

Such a device can resist, without damage, the large differences in pressure while retaining its sensitiveness when the pressures are equalized.

In the accompanying drawing:

Fig. 1 is a diagrammatic view illustrating the application of the invention to a measuring assembly.

Fig. 2 is a cross sectional view of one embodiment of the invention and

Fig. 3 is a similar sectional view of another embodiment.

The parts common to both embodiments will be first described.

A connecting tubular member 12 is connected at one end to an air tank, not shown, in which is maintained a substantially constant pressure P, appreciably higher than atmospheric pressure. The other end of the tubular member is connected to two passages 13 and 14 in shunt, said passage containing calibrated orifices 15 and 16, assumed identical for simplification of the description. The passages 13 and 14 are provided in a casing 17. The passage 13 leads into a chamber 18 communicating with the atmosphere through a calibrated downflow orifice 19 provided in a plate 20 covering the chamber 18; the passage 14 leads into a smaller chamber 21 communicating with the atmosphere through a second calibrated orifice 22.

A differential pressure indicating device, described hereinafter, is interposed between the pneumatic chambers 18 and 21, which are the equivalent of the respective chambers 8 and 9 of the Wheatstone bridge assembly shown in Fig. 1.

Into the bottom of the chamber 18 is fitted an annular fluid-tight lining 23. A dished or concave circular trough 24 is secured in a fluid-tight manner to the lining 23 at its lower edge 25 projecting from the under face 26 of the said trough 24. Consequently the under face 26 is located at a predetermined distance from the bottom of the chamber 18. The trough 24 is provided with a number of perforations 27 distributed uniformly and its upper edge is flat; it serves to support the periphery or rim of a circular diaphragm 29 normally flat and equally deformable by pressure from either side thereof.

A second trough 30, substantially similar to the first, but inverted and provided with perforations 31, is disposed on its flat lower edge 32 to the periphery or rim of the diaphragm 29 which is thus clamped between the two troughs and secured to the casing 17 by securing means not shown.

The concave surfaces of the two troughs 24, 30 are located opposite one another and also have the same axis of rotation $z$—$z$, coincident with the axis of symmetry of the diaphragm. These concave surfaces are so shaped that they form bearing surfaces for practically the whole of the effectively deformable portion of the diaphragm.

The diaphragm 29 carries at its center a boss 33 secured to a rod 34 passing freely through the upper trough 30 and connected to a resiliently flexible contact bar 35 of which one end is connected to a terminal 36. The free end of the contact bar 35 is located between two conducting blades 37, 38 clamped in an insulating block 39, but does not touch either when the located diaphragm 29 is in neutral position.

The calibrated orifice 22 opens at a short distance $d$ from an object $b$, the dimensions of which it is desired to measure.

The free cross section of the second orifice is modified by an axially movable needle or valve stem 40.

All the members which have been described with reference to Fig. 2 occur in the same manner and similarly combined in the apparatus shown in Fig. 3. They form a kind of pneumatic Wheatstone bridge.

The apparatus of Fig. 2 which serves to measure automatically, for example, the variations in thickness of a rod $b$, seen in end view resting on a support M that the operator moves longitudinally, is also provided with a reversible or electric servo-motor 41 with two directions of rotation of which the field windings, of opposite direction, are connected to blades 37 and 38, respectively. One pole of the source of current S is connected directly to the terminal 42 of the motor. The other pole is grounded to the casing 17 by a lead 43.

A pinion 44, mounted at the end of the shaft of the motor 41 meshes with long internal teeth of a transmission flange 45 which is rotatable about and slidable along the axis 22. The hub 46 of the flange 45 has a screw thread engaging with a screw-threaded bore 47 of a cover plate 20. The flange 45 carries on its outer edge a scale 48 movable under a stationary pointer 49.

The apparatus is used as follows.

As the horizontal support M is adjustable in height, it is placed in such a position that the distance $d$ of the calibrated orifice 22, from the upper face of the rod $b$ determines for this orifice a free cross section for the passage of air of the same resistance as that opposed by the orifice 19 into which the needle 40 has been moved previously into an arbitrary "zero" position marked by the scale 48.

The operator moves the rod $b$ longitudinally on the support M. When its thickness varies the distance $d$ likewise varies and the free cross section for the passage of air through the orifice 22 is modified which, in turn, modifies the pressure in the chamber 21 acting on the lower face of the diaphragm 29. When, for example, a lowering of the sensitive pressure occurs, the said diaphragm curves downwardly towards the bottom and its useful surface bears almost over its entire area against the concave surface of the trough 24 which serves as a support therefor while avoiding any deleterious urging of the diaphragm under the action of the difference in pressure between the chambers 18 and 21, that is, avoiding movement of the diaphragm beyond its elastic limit. When curving in this manner, the diaphragm carries with it the bar 35 which closes the circuit of the motor 41 by coming into resilient contact with the blade 38. The motor 41 starts, causing the flange 45 to turn, which produces an axial ascending movement of the needle 40 in the orifice 19 until the resistance opposed by this orifice has become equal to that opposed by the orifice 22 opposite the bar.

Equilibrium of the pressures between the chambers 18 and 21 is thus re-established, the diaphragm resumes its mean or neutral position, seen in Fig. 2, and the bar 35 moves away from the blade 38. The circuit through members 42, 41, 38, 35, 36 troughs, casing and lead 43 being broken, the motor 41 stops. During the rotation of the motor 41, the scale 48 has turned under the pointer 49 by an amount which is a function of the variation necessary of the cross section of the orifice 19 for re-establishing equilibrium of pressures between the chambers 18 and 21. This quantity, read directly on the scale, indicates to the operator how much the distance $d$ has increased and, consequently, how much the thickness $e$ of the bar has decreased, relatively to the thickness of the bar in its initial position.

Conversely, when the thickness increases between two successive positions of the bar $b$, the pressure increases in the chamber 21, the diaphragm curves upwardly until it bears against the trough 30. The bar 35 closes the circuit of the motor by contacting the blade 37, the motor 41 starts in a direction opposite to its previous direction of rotation, until pneumatic equilibrium is re-established between the chambers 18 and 21. The diaphragm 29 returns to its mean or neutral position and breaks the circuit between the blade 39 and the bar 35. The new position assumed by the scale 48 behind the marking pointer 49, enables the increase in thickness $e$ of the bar $b$ to be ascertained from the region measured previously. In continuing the movement of the bar in this manner, then stopping it each time the motor 41 starts until the motor stops automatically, it is possible to measure the variation in thickness of the bar over its entire length in a semi-automatic manner.

Even when, involuntarily, the bar is moved suddenly from the orifice 22, the sudden lowering of pressure then produced in the chamber 21 is not liable to damage the diaphragm 29 which simply bears over its entire useful surface against the concave surface of the lower trough 24. The perforations 27 have too small a diameter to enable a thrust of sufficient value to pass therethrough for damaging the diaphragm even when it is thin and therefore sensitive.

In the apparatus shown in Fig. 3, and which may serve for measuring the dimensions of an object $b$ or of a series of objects, the needle 40 is secured to an operating knob 51 of which the threaded spindle 52 engages with a screw threaded bore 47 of a cover plate 20. The conducting blades 37 and 38 are connected to two different circuits 53, 54 in parallel in a distributing network S. In a very simple example, these circuits may be formed by signalling lamps of different colors. It will at once be seen that a variation of the dimension of an object $b$ producing an increase of pressure in the chamber 21 is translated by curving of the diaphragm 29 upwardly and by the closing of contacts 35, 37 resulting in the lighting of the lamp 53. The operator then actuates the knob 51 in such a direction that the needle 40 penetrates considerably into the orifice 19, until the lamp 53 is extinguished, indicating the return of the diaphragm 29 to the neutral or mean position and the re-establishment of equilibrium of the pressures in chambers 18 and 21. Reading the scale 48 gives the new value of the distance $d$, and therefore, the variation in dimension of the object $b$.

If it is the lamp 54 which lights, the variation of the dimension of the object $b$ is in the opposite direction.

It will be understood that the possible applications of the invention, are numerous, the applications shown in Figs. 2 and 3 being illustrations only. In particular the device may be applied to the automatic control, for example, of a truing device. In using the device shown in Fig. 3 for this purpose, the contact blade 37 is omitted, because the truing machine, such as a grinding wheel, operates only to shorten the dimension. Consequently, control in only one direction is necessary.

From the foregoing description it will be seen that the invention has, among others, the following technical advantages:

1. The possibility of operating at a high pressure, while using a very pliant diaphragm which is very sensitive to small differences in pressure, at the same time being resistant to great differences in pressure between its two faces, which makes it possible to take full advantages of a Wheatstone bridge assembly.

2. The provision of an apparatus of very small dimensions which responds very rapidly to variations in dimensions of the object to be measured or controlled. In fact an extremely rapid reaction of the apparatus is obtained by reducing the effective volume of the gaseous medium located on the downstream of the orifice 16, by placing this orifice at the outlet of the passage 14 in a cylindrical cavity forming the chamber 21.

I claim:

A pneumatic gauge comprising a casing having a pair of separate gas chambers therein, said chambers having a common wall consisting of a yieldable diaphragm, a pair of perforated concave members straddling and holding the rim of said diaphragm against axial movement, said concave members being also adapted to limit the axial displacement of the center of the diaphragm, each of said chambers having a gas inlet, means for delivering a gas under pressure to said inlets from a common source, each of said chambers having also an outlet, the outlet of one chamber being adapted to be disposed in proximity to a surface of an object to be gauged, the other outlet having valve means therein, means including an external rotatable member for actuating said valve means, a scale carried by said rotatable member, a stationary pointer adjacent said scale, a double throw electrical switch having a movable element, said element being connected for movement with the center of said diaphragm, a reversible electric motor mechanically geared to said rotatable member, said switch being electrically connected to said motor.

ANDRÉ LOUIS AIMÉ FORTIER.

REFERENCES CITED

The following references are of record in the file of this patent:

UNITED STATES PATENTS

| Number | Name | Date |
|---|---|---|
| 2,125,949 | O'Conner | Aug. 9, 1938 |
| 2,216,374 | Martin | Oct. 1, 1940 |
| 2,266,566 | Poole | Dec. 16, 1941 |
| 2,347,590 | Binder | Apr. 25, 1944 |
| 2,350,058 | May | May 30, 1944 |
| 2,352,312 | Donaldson | June 27, 1944 |
| 2,390,252 | Hayward | Dec. 4, 1945 |
| 2,516,932 | Wainwright | Aug. 1, 1950 |